United States Patent
Sullivan et al.

(10) Patent No.: US 10,248,158 B2
(45) Date of Patent: Apr. 2, 2019

(54) ENCLOSURE ASSEMBLY AND MONITOR DEVICE INCLUDING SAME

(71) Applicant: Microsoft Technology Licensing, LLC, Redmond, WA (US)

(72) Inventors: Timothy M. Sullivan, Woodinville, WA (US); James D. Wahl, Woodinville, WA (US); Stephen A. Cummings, Wilsonville, OR (US); David P. Platt, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 15/331,487

(22) Filed: Oct. 21, 2016

(65) Prior Publication Data

US 2018/0116058 A1 Apr. 26, 2018

(51) Int. Cl.
*G06F 1/16* (2006.01)
*F16M 11/10* (2006.01)

(52) U.S. Cl.
CPC ........... *G06F 1/1601* (2013.01); *F16M 11/10* (2013.01); *G06F 1/1607* (2013.01)

(58) Field of Classification Search
CPC .. H05K 5/0017; H05K 5/0004; H05K 5/0234; H05K 5/03
USPC ................................................ 361/807, 810
See application file for complete search history.

(56) References Cited

U.S. PATENT DOCUMENTS

| | | | | |
|---|---|---|---|---|
| 7,729,127 B2 * | 6/2010 | Yeh | ......................... | H05K 7/142 361/803 |
| 7,751,203 B2 * | 7/2010 | Moon | .................... | G06F 1/1626 361/707 |
| 8,040,689 B2 * | 10/2011 | Weber | ................... | G06F 1/1613 361/720 |
| 8,350,984 B2 * | 1/2013 | Perry | ....................... | H05K 5/03 349/56 |
| 8,714,665 B2 | 5/2014 | Campagna et al. | | |
| 9,395,040 B1 * | 7/2016 | Shawver | ................ | F16M 13/02 |
| 9,419,669 B2 * | 8/2016 | Smith | ...................... | A45C 5/02 |
| 9,615,476 B2 * | 4/2017 | Rayner | .................. | H05K 5/061 |

(Continued)

OTHER PUBLICATIONS

"3M™ Multi-Touch Display C2254PW", Retrieved on: Aug. 23, 2016 Available at: http://multimedia.3m.com/mws/media/697873O/3mtm-multi-touch-display-c2254pw.pdf.

*Primary Examiner* — Binh B Tran
*Assistant Examiner* — Douglas R Burtner
(74) *Attorney, Agent, or Firm* — Arent Fox LLP

(57) ABSTRACT

An enclosure assembly of a monitor device includes an enclosure cover having a cover wall extending substantially in a first plane between a plurality of sides, wherein the cover wall includes an interior surface and an opposing exterior surface. The enclosure assembly includes a first stiffener wing and a second stiffener wing each having one or more mounting portions spaced apart from one or more stiffener portions to define one or more wing body ribs, each mounting portion including a mounting surface opposing a corresponding portion of the interior surface of the cover wall. The first stiffener wing includes a first wing body that extends toward a first side of the enclosure cover, and the second stiffener wing includes a second wing body that extends to a second side of the enclosure cover. Additionally, a display and/or a base assembly may be mounted to the enclosure assembly.

21 Claims, 15 Drawing Sheets

(56) References Cited

U.S. PATENT DOCUMENTS

| | | | |
|---|---|---|---|
| 9,616,625 B2* | 4/2017 | Allore | B29C 45/14311 |
| 9,629,268 B2* | 4/2017 | Lee | H05K 5/0247 |
| 9,637,063 B1* | 5/2017 | Shawver | B60R 11/0252 |
| 9,645,607 B2* | 5/2017 | Becze | G06F 3/1438 |
| 9,690,385 B2* | 6/2017 | Becze | G06F 3/1438 |
| 9,772,688 B2* | 9/2017 | Patel | H01F 7/126 |
| 9,829,930 B2* | 11/2017 | Thomason | G06F 1/1616 |
| 9,829,982 B2* | 11/2017 | Bernstein | G06F 3/016 |
| 2001/0048593 A1* | 12/2001 | Yamauchi | H05K 9/006 361/807 |
| 2003/0076652 A1* | 4/2003 | Ahn | G06F 1/1616 361/679.02 |
| 2003/0226935 A1* | 12/2003 | Garratt | B21B 1/08 244/123.7 |
| 2004/0257785 A1* | 12/2004 | Chen | G06F 1/184 361/807 |
| 2005/0152106 A1* | 7/2005 | Coster | G06F 1/181 361/679.58 |
| 2007/0137124 A1* | 6/2007 | MacDermott | E04B 2/745 52/278 |
| 2008/0062153 A1* | 3/2008 | Moolsintong | G06F 1/1626 345/184 |
| 2008/0117615 A1* | 5/2008 | Jeong | H05K 5/02 361/807 |
| 2008/0151558 A1* | 6/2008 | Meyer | E04B 9/32 362/367 |
| 2008/0218956 A1* | 9/2008 | Bang | H05K 5/02 361/679.02 |
| 2009/0231808 A1 | 9/2009 | Burgner | |
| 2009/0246461 A1* | 10/2009 | Linares | B65D 19/0028 428/138 |
| 2009/0290089 A1* | 11/2009 | Ichioka | G02F 1/133308 349/58 |
| 2010/0110653 A1* | 5/2010 | Hisada | H04M 1/0216 361/810 |
| 2011/0286196 A1* | 11/2011 | Hamaguchi | F16B 1/0057 361/807 |
| 2011/0304968 A1* | 12/2011 | Knopf | G06F 1/181 361/679.6 |
| 2011/0315824 A1* | 12/2011 | Pook | B29C 70/443 244/133 |
| 2012/0050988 A1 | 3/2012 | Rothkopf et al. | |
| 2012/0051020 A1* | 3/2012 | Ohsawa | H05K 5/0221 361/807 |
| 2012/0052247 A1* | 3/2012 | Pook | B29C 65/5057 428/161 |
| 2012/0063113 A1* | 3/2012 | Hisakawa | G02F 1/133308 361/807 |
| 2012/0206895 A1* | 8/2012 | Shirasaka | G06F 1/1656 361/807 |
| 2012/0250276 A1* | 10/2012 | Nakajima | G06F 1/1626 361/752 |
| 2013/0207793 A1* | 8/2013 | Weaber | G06F 1/1601 340/407.2 |
| 2013/0294020 A1* | 11/2013 | Rayner | H05K 5/061 361/679.01 |
| 2013/0328051 A1 | 12/2013 | Franklin et al. | |
| 2013/0328741 A1 | 12/2013 | Degner et al. | |
| 2014/0111929 A1* | 4/2014 | Andre | G06F 1/1656 361/679.27 |
| 2014/0111933 A1* | 4/2014 | Knopf | G06F 1/20 361/679.34 |
| 2014/0184043 A1 | 7/2014 | Sprenger et al. | |
| 2015/0146401 A1* | 5/2015 | Su | H05K 5/0247 361/807 |
| 2015/0255853 A1 | 9/2015 | Kwong et al. | |
| 2015/0378466 A1 | 12/2015 | Emery et al. | |
| 2016/0014247 A1 | 1/2016 | Behles et al. | |
| 2016/0054762 A1* | 2/2016 | Garelli | G06F 1/1656 361/679.55 |
| 2016/0170250 A1 | 6/2016 | Ghali et al. | |

* cited by examiner

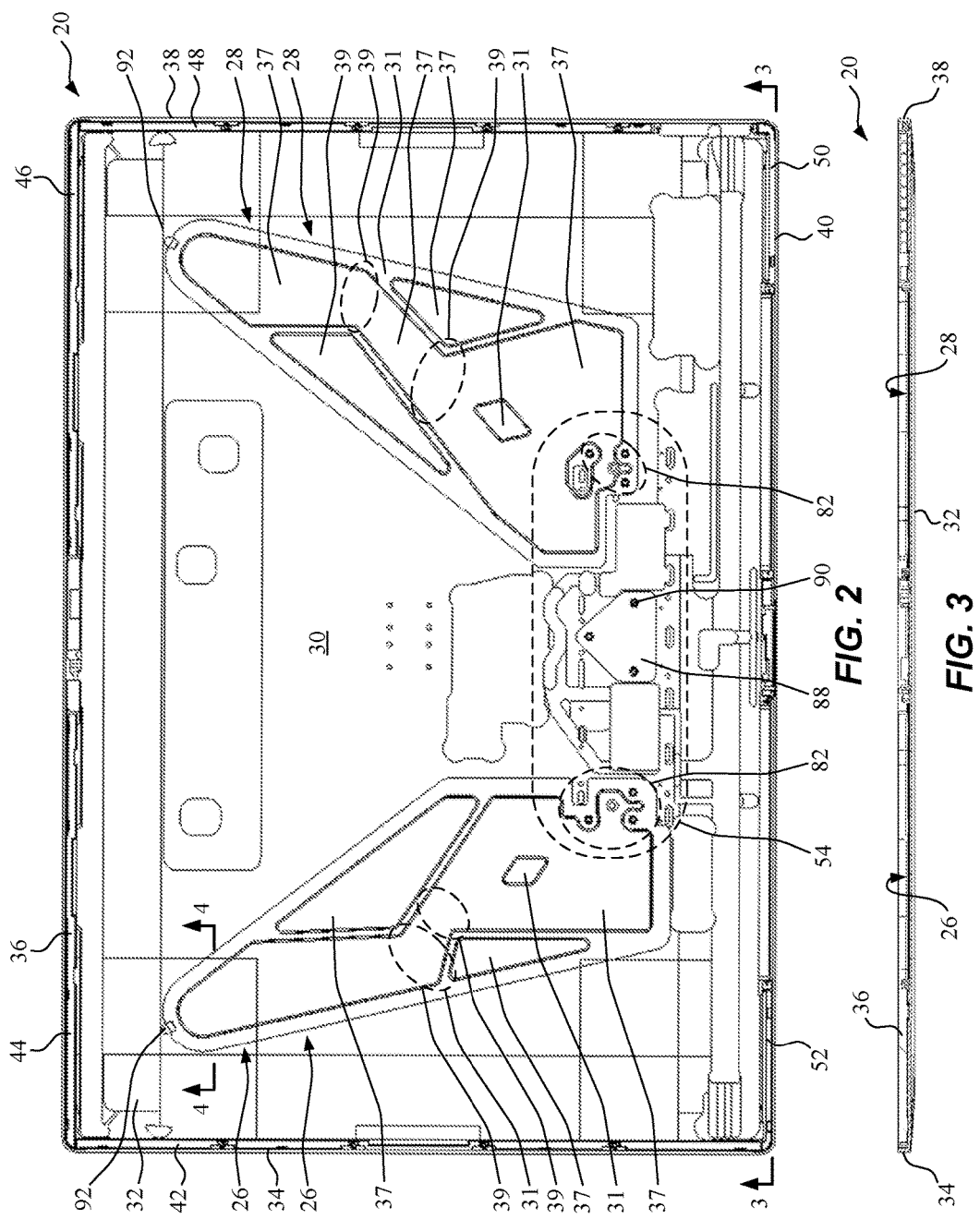

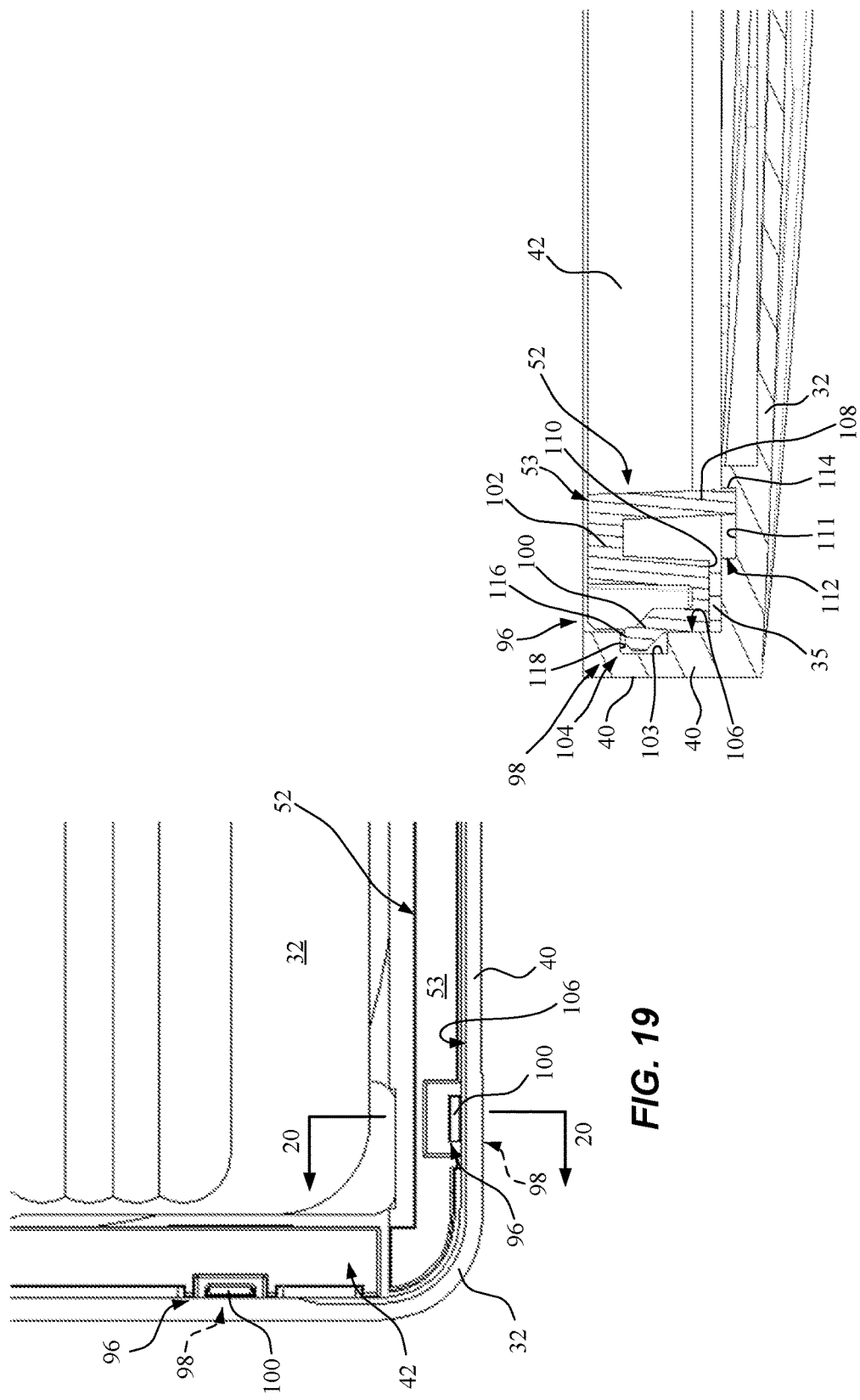

FIG. 23
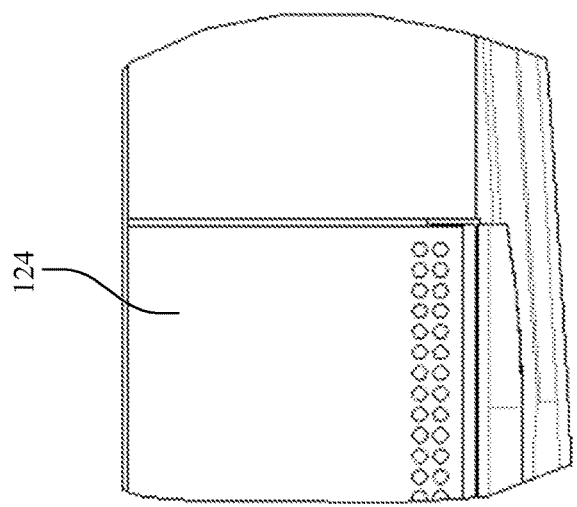
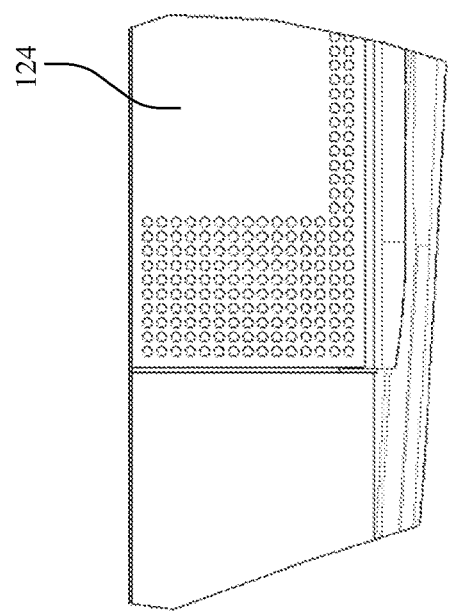
FIG. 24

ENCLOSURE ASSEMBLY AND MONITOR DEVICE INCLUDING SAME

BACKGROUND

The present disclosure relates to an enclosure for a device, and more particularly, to an enclosure for a monitor or display device.

There is an ever-increasing consumer demand for monitor devices (e.g., displays, tablet devices, mobile phones) having an increased display area, but a reduced thickness and weight. Often coinciding with this demand is a consumer expectation of a monitor device having a high quality look and feel. From a structural design standpoint, the consumer demand and quality expectation can be conflicting goals. For instance, in a monitor device having a large touchscreen display, an enclosure in which the display is mounted requires structural support to provide a rigid, firm, high quality feel to the user of the device. To achieve such support, prior solutions have relied on enclosures having additional and/or relatively thicker (as compared to enclosures for smaller displays) support structures, which increases the weight and bulkiness of the monitor device, much to the dissatisfaction of users.

Thus, there is a need in the art for improvements in enclosures for a monitor or display device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to an enclosure assembly of a monitor device. The enclosure assembly includes an enclosure cover having a cover wall extending substantially in a first plane between a plurality of sides, wherein the cover wall includes an interior surface and an opposing exterior surface. Further, the enclosure assembly includes a first stiffener wing and a second stiffener wing each having one or more mounting portions spaced apart from one or more stiffener portions to define one or more wing body ribs, wherein each mounting portion includes a mounting surface opposing a corresponding portion of the interior surface of the cover wall. Additionally, the first stiffener wing includes a first wing body that extends toward a first side of the enclosure cover, and the second stiffener wing includes a second wing body that extends to a second side of the enclosure cover different from the first side.

Another implementation relates to a monitor device. The monitor device includes an enclosure cover having a cover wall extending substantially in a first plane between a plurality of sides, wherein the cover wall includes an interior surface and an opposing exterior surface. Further, the monitor device includes a first stiffener wing and a second stiffener wing each having one or more mounting portions spaced apart from one or more stiffener portions to define one or more wing body ribs, wherein each mounting portion includes a mounting surface opposing a corresponding portion of the interior surface of the cover wall. The first stiffener wing includes a first wing body that extends toward a first side of the enclosure cover, and the second stiffener wing includes a second wing body that extends to a second side of the enclosure cover different from the first side. Also, the monitor device includes a plurality of deck insert members along one or more portions of a perimeter of the interior surface, one or more of the plurality of deck members including a mounting surface, and a display fixedly mounted to each mounting surface via one or more fixing members. Additionally, the monitor device includes a monitor base assembly fixedly connected to the enclosure cover and the display.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 2 is a front view of an assembled implementation of the portion of the example enclosure assembly of FIG. 1;

FIG. 3 is a cross-sectional view along line 3-3 in FIG. 2;

FIG. 19 is a close-up, front view of the bottom left corner of the enclosure assembly of FIG. 2, including features of attachment members that snap deck insert members into place in the enclosure cover;

FIG. 20 is a cross-sectional view along line 20-20 in FIG. 19;

FIG. 23 is a bottom view of an assembled version of the monitor device of FIG. 6; and FIG. 24 is a close-up view of a portion of FIG. 23 including speaker covers.

DETAILED DESCRIPTION

Figure 1:
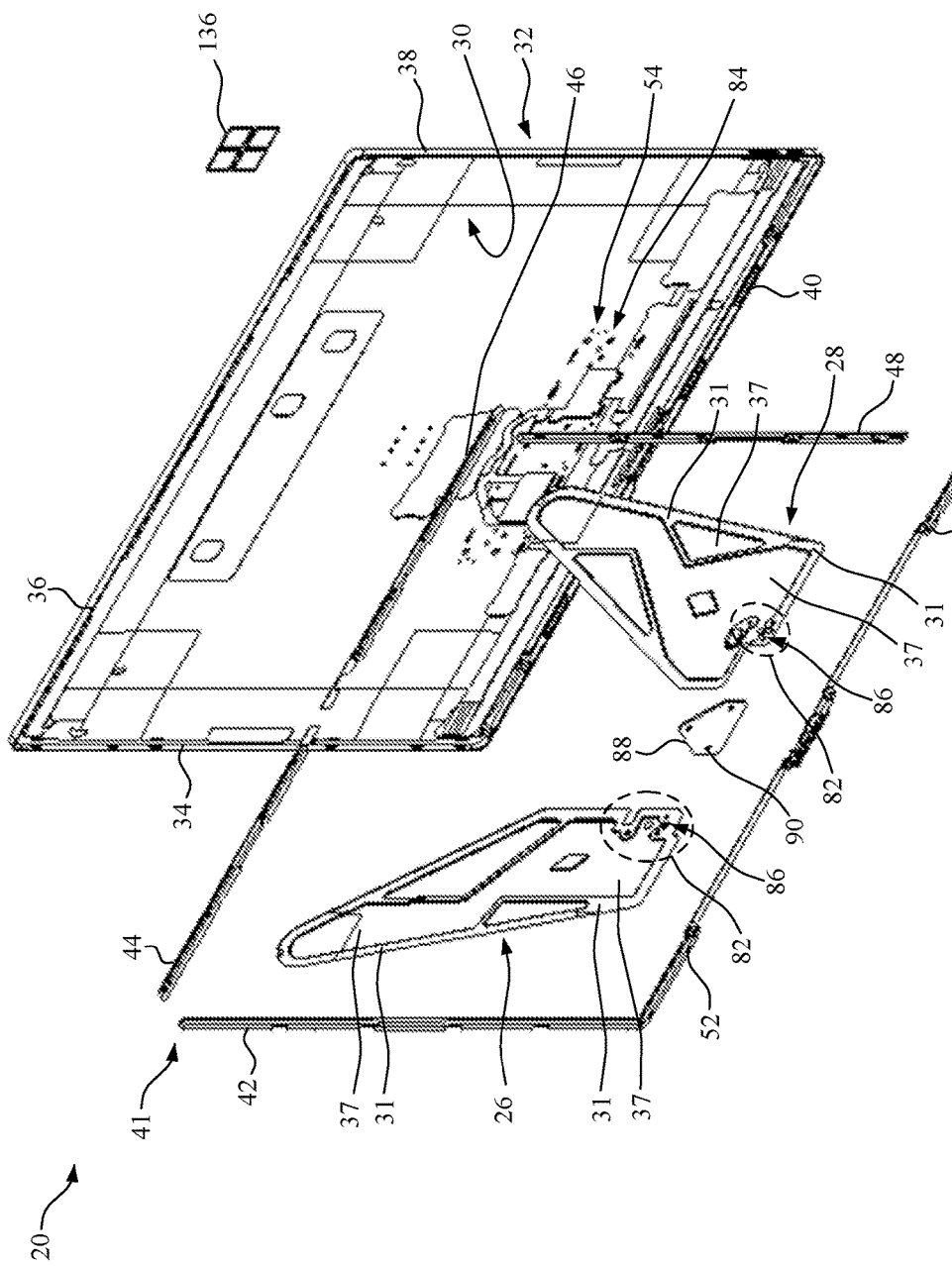
FIG. 1 is an exploded perspective view of a portion of an example enclosure assembly according to this disclosure, the portion including, among other features, an enclosure cover, deck insert members, and first and second stiffener wings.
Figure 4:
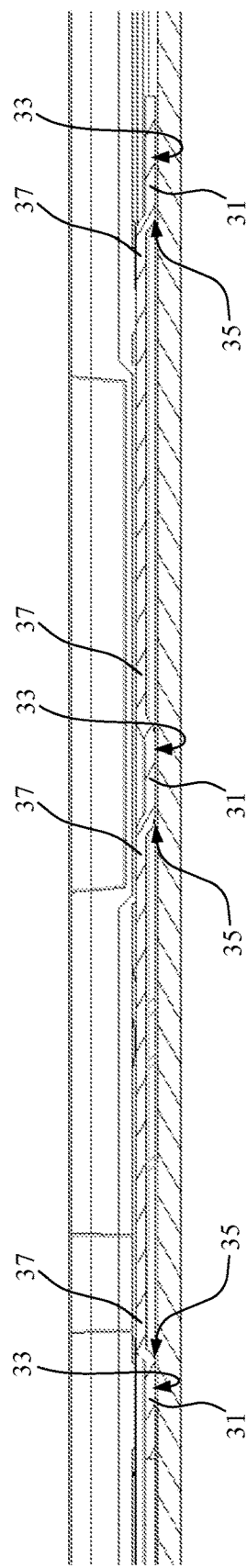
FIG. 4 is a partial cross-sectional view along line 4-4 in FIG. 2.
Figure 5:
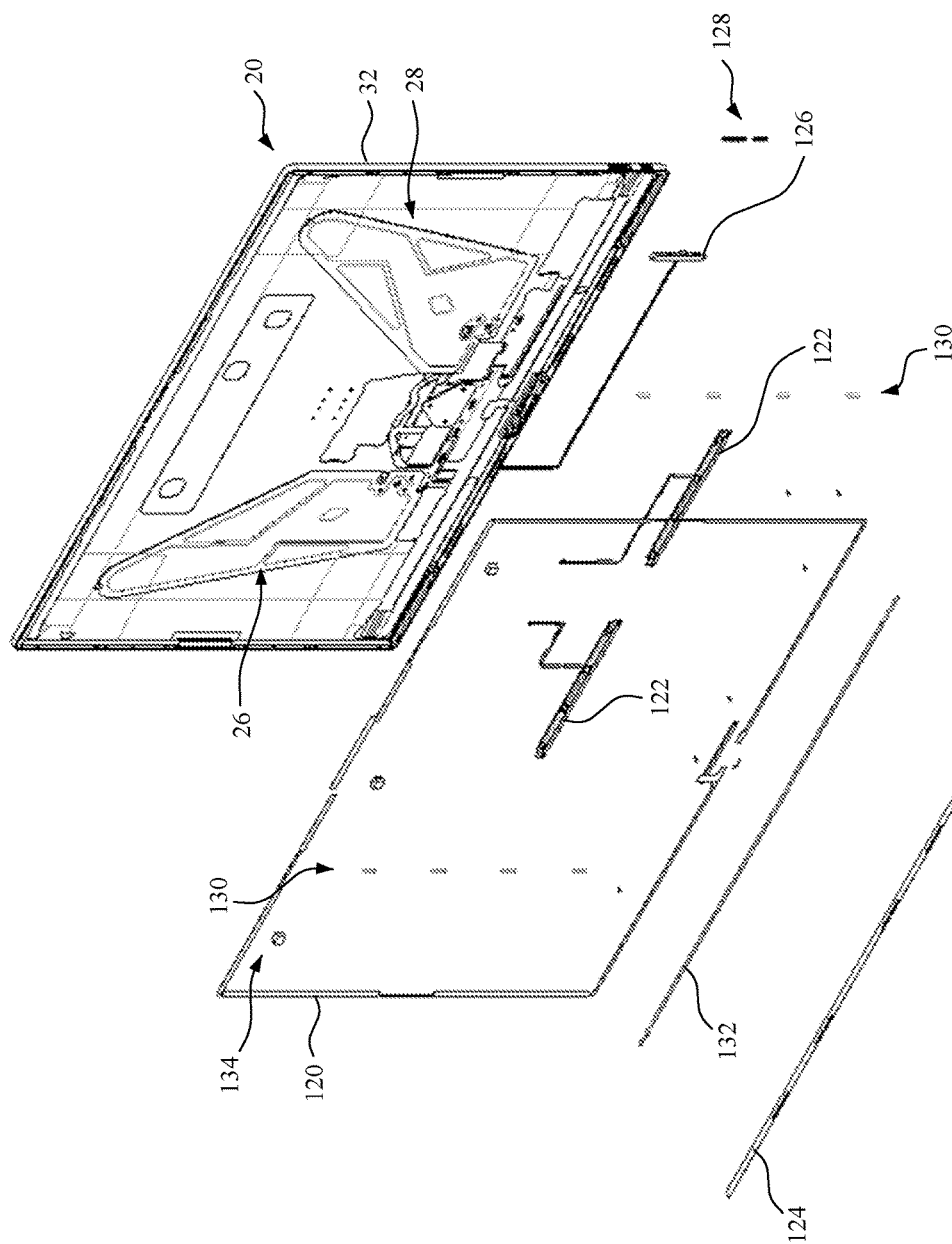
FIG. 5 is an exploded perspective view of additional portions of the example enclosure assembly of FIG. 1, the additional portions including, among other features, a fixing member, speakers, and buttons.
Figure 6:
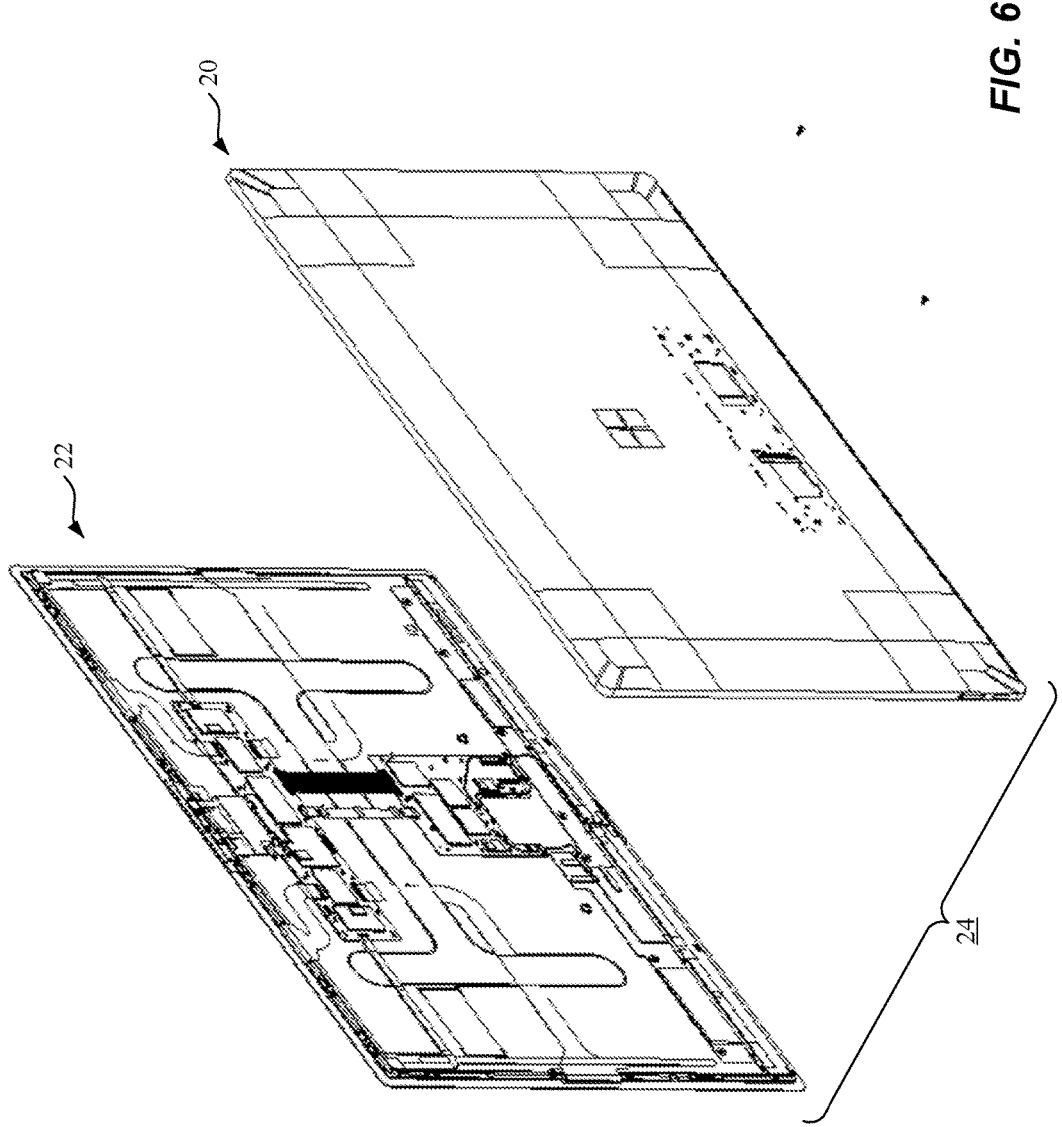
FIG. 6 is an exploded, back perspective view of the example enclosure assembly and a display mountable to the enclosure assembly, and which may be further secured by screws, to define an example monitor device.

The present disclosure includes an enclosure assembly having a combination of structural support features to provide a structurally robust support chassis to which a display may be mounted to form a monitor device. Specifically, the enclosure assembly includes opposing stiffener wings fixed to and extending across a portion of an interior surface of an enclosure cover to structurally support the display. For instance, in the case of a touch display, the stiffener wings increase the stiffness of the enclosure cover and/or otherwise provide support to oppose deflection of the enclosure cover in response to force applied to the display and/or monitor device. Additionally, the enclosure assembly may include deck members along one or more portions of a perimeter of the interior surface, and adjacent to one or more side walls, of the enclosure cover to provide a mounting surface for the display and for additional structural stability.

For example, in one specific implementation that should not be construed as limiting, the enclosure cover may be a metal enclosure, which may be stamped from a single flat piece of sheet metal and forged to shape with four vertical sidewalls. The opposing stiffener wings may include ribbed metal stiffener plates adhered to the interior surface of the enclosure cover to provide adequate stiffness to the final structure. The deck members may be plastic deck inserts adhered to the inside perimeter of the enclosure cover to provide adequate bonding surface area for the display, which may be a touch display module. In some implementations, the enclosure cover may include machined features, and the deck members may include post-assembly machined features, both which may achieve dimensional accuracy for mounting interfaces to other components, such as the display, and/or for clearance for other components on the display.

The enclosure assembly disclosed herein may be particularly suited for relatively low profile monitor devices (as compared to existing monitor devices), as the configuration of the enclosure cover and stiffeners wings (and, optionally, deck members) provide sufficient structural support to resist bending while minimizing a profile (e.g., depth) and/or weight of the enclosure assembly and/or monitor device. Thus, in some implementations, the enclosure assembly may enable a monitor device to meet consumer demands and expectations of a high quality, lightweight, thin device.

Referring to FIGS. 1-9, in an example implementation, an enclosure assembly 20 includes a structurally robust chassis configured to receive a display 22 (see FIGS. 6-8) and, upon assembly, to form a monitor device 24 (see FIGS. 6-9). In some implementations, monitor device 24 may further include a monitor base assembly 56 (see FIGS. 7-9) for holding monitor device 24 in one or more positions.

For example, the structurally robust chassis of enclosure assembly 20 is defined, at least in part, by a first stiffener wing 26 and a second stiffener wing 28 extending along and fixed to portions of an interior surface 30 of an enclosure cover 32. In some applications, the configuration of enclosure assembly 20 including first stiffener wing 26 and second stiffener wing 28 may be particularly suited for use in constructing a relatively low profile yet sturdy enclosure assembly 20 and monitor device 24.

Referring more specifically to FIGS. 1-5, first stiffener wing 26 and second stiffener wing 28 may respectively include one or more structures for affixing the respective stiffener wing to interior surface 30 of enclosure cover 32. Additionally, first stiffener wing 26 and second stiffener wing 28 may respectively include one or more structures for providing structural support to enclosure cover 32, e.g., to resist bending or twisting, in order to firmly support display 22.

In an example implementation, for instance, first stiffener wing 26 and a second stiffener wing 28 each include a wing body defined, in part, by one or more mounting portions 31 having a mounting surface 33 opposing (e.g., facing) a corresponding portion of interior surface 30 of enclosure cover 32. Each mounting surface 33 and each corresponding portion of interior surface 30 of enclosure cover 32 have a complimentary, mating shape such that they may be positioned and fixedly positioned adjacent to one another by a fixing device 35. For example, fixing device 35 may include, but is not limited to an adhesive, a rivet, a screw, a nut and bolt, a weld, or any other mechanism that may be used to connect and fixedly position first stiffener wing 26 and second stiffener wing 28 relative to enclosure cover 32. In some cases, for instance, the choice of fixing device 35 may be based on the materials of first stiffener wing 26, second stiffener wing 28, and to enclosure cover 32, and/or the expected weight to be supported, and/or the expected ambient and operating temperatures. In one example implementation, for instance where first stiffener wing 26, second stiffener wing 28, and enclosure cover 32 are formed from a metal material, such as but not limited to stainless steel (e.g., Type 304 stainless steel, also known as SUS 304) and aluminum (e.g., aluminum alloy 5052), respectively, and with monitor device 24 having a weight in the range of about 1-2 kg, fixing device 35 may be an adhesive such as, but not limited to, a dispensable liquid adhesive. The number, shape, and position of each of the one or more mounting portions 31 and mounting surfaces 33 may have any of a variety of configurations depending on the particular application. For example, such as in the non-limiting implementation of FIG. 1, each of first stiffener wing 26 and second stiffener wing 28 may include a plurality of mounting portions 31, where such a plurality includes one or more mounting portions 31 about a perimeter area of each wing body, and one or more mounting portions 31 located at an interior area of each wing body. Such a configuration allows for a secure connection with enclosure cover 32 across the respective wing body of each of first stiffener wing 26 and second stiffener wing 28.

Additionally, in the example implementation, the wing body of first stiffener wing 26 and second stiffener wing 28 may be further defined, in part, by one or more stiffener portions 37 sized and shaped to provide rigidity to each stiffener wing and to enclosure cover 32. The one or more stiffener portions 37 may be raised up from, and/or on a different plane than, the one or more mounting portions 31 (see, e.g., FIG. 4). For instance, the one or more mounting portions 31 may be located substantially in a first plane and the one or more stiffener portions 37 may be located substantially in a second plane spaced apart from the first plane. Consequently, since the first plane in which the one or more mounting portions 31 are substantially located is adjacent to interior surface 30 of enclosure cover 32, the one or more stiffener portions 37 substantially located in the second plane are spaced apart from interior surface 30.

Figure 7:
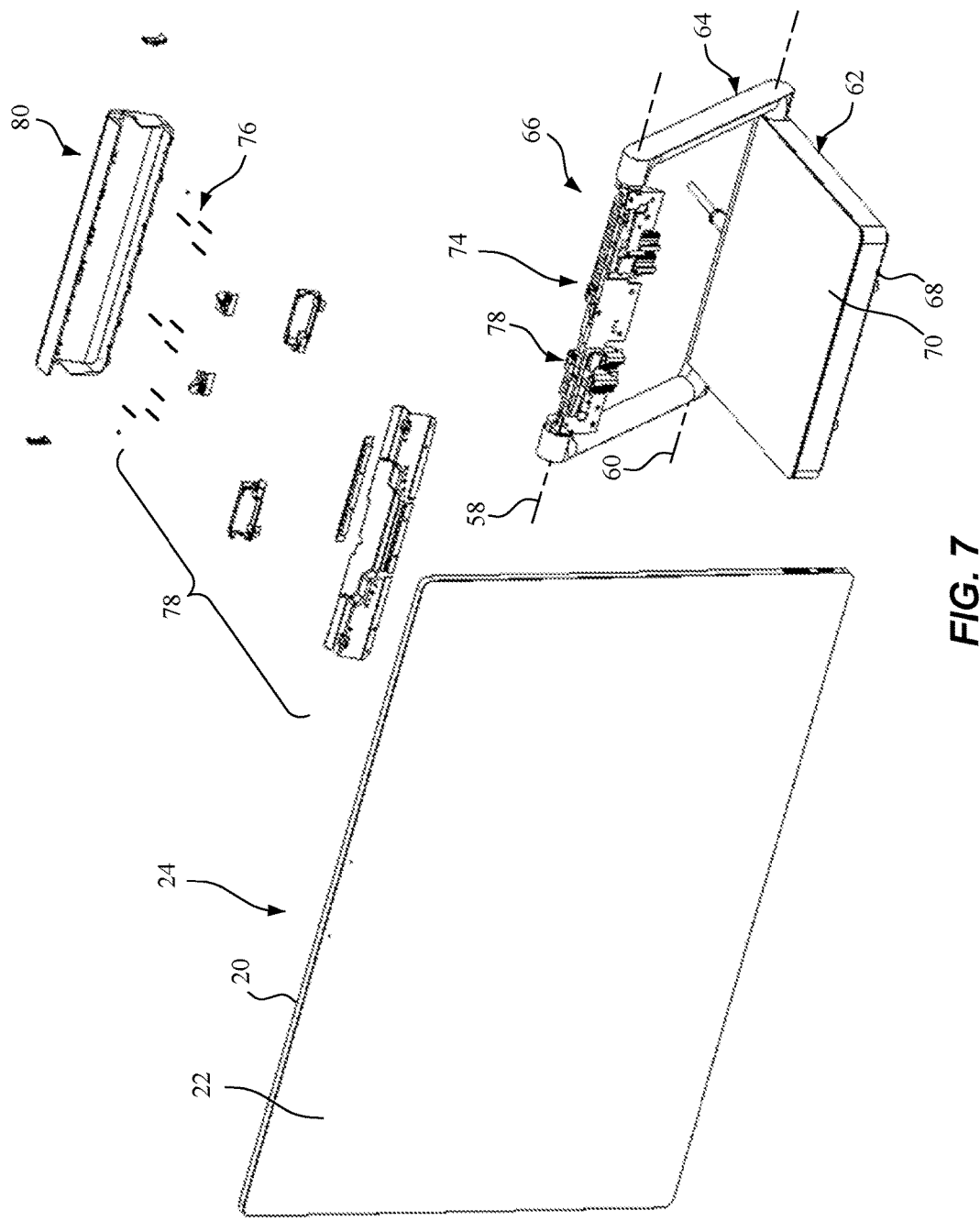
FIG. 7 is an exploded perspective view of the example monitor device of FIG. 6 and an example monitor base assembly that may be fixed to the monitor device.
Figure 9:
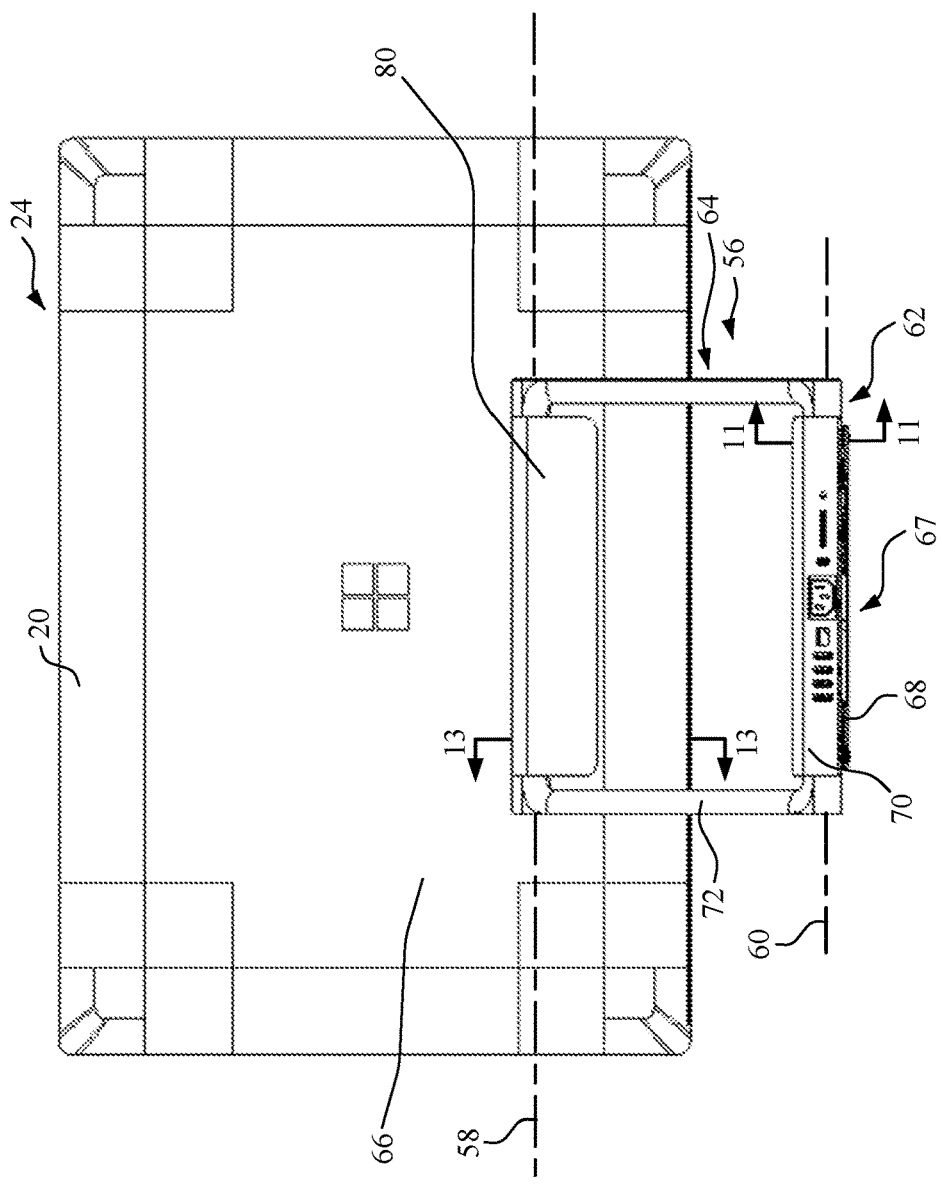
FIG. 9 is a back view of the assembled version of the example monitor device and the example monitor base assembly of FIG. 7.
Figure 8:
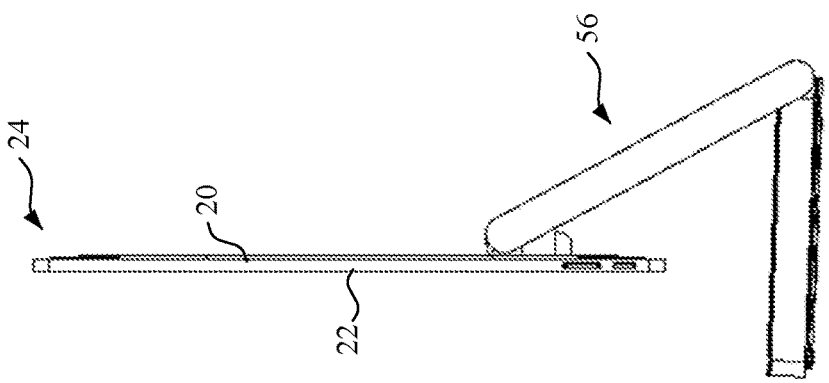
FIG. 8 is a right side view of the assembled version of the example monitor device and the example monitor base assembly of FIG. 7.
Figure 11:
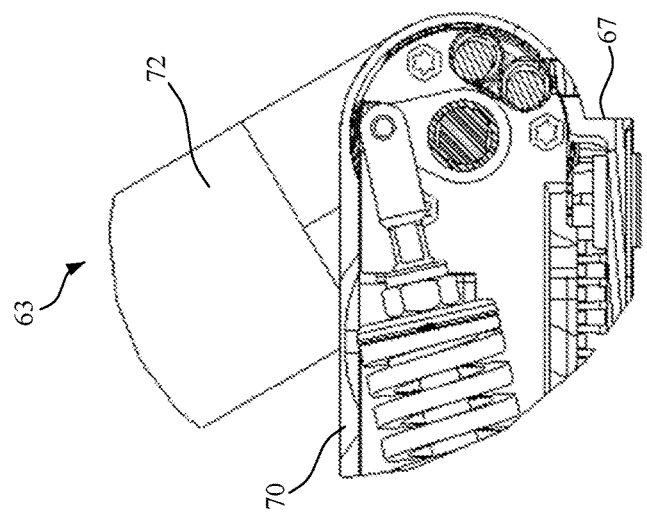
FIG. 11 is a partial cross-sectional view of an example variable rotation mechanism that is hidden from view in FIG. 10.
Figure 10:
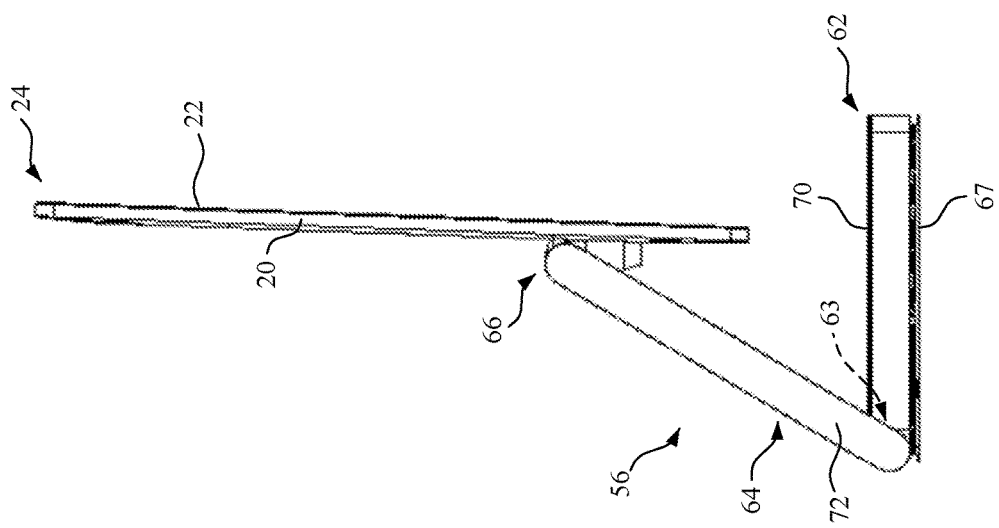
FIG. 10 is a left side view of the assembled version of the example monitor device and the example monitor base assembly of FIG. 7.

The combination of the one or more mounting portions 31 and the one or more stiffener portions 37 may define the wing body of each of first stiffener wing 26 and second stiffener wing 28 as having a ribbed shape, e.g., a body having one or more ridges or ribs (see, e.g., FIGS. 1, 2, 4, and 14). The one or more stiffener portions 37, and hence the ribs defined by the raised one or more stiffener portions 37, may extend in one or more directions. For example, the one or more stiffener portions 37 may extend in one or more directions furthest from a point or area where enclosure cover 32 and/or monitor device 24 may have a relatively higher degree of structural support, e.g., a support mounting area 54 where enclosure cover 32 may have a relatively thicker wall and/or where enclosure cover 32 may be connected to an external supporting component such as monitor base assembly 56 (FIGS. 7-9). As such, the one or more stiffener portions 37 may extend across enclosure cover 32 in areas that, without the stiffener portions 37, may have relatively weaker structural support. So, the one or more stiffener portions 37 may thereby provide additional support in those areas having relatively less support.

Further, in some implementations, different ones of the one or more stiffener portions 37 extending in different directions may be connected at a junction 39 (see, e.g., FIG. 2), which enhances the rigidity of each respective stiffener portion 37 that meets at junction 39. Also, in some examples, the one or more stiffener portions 37 may include mounting surfaces facing display 22 for receiving and supporting one or more portions of display 22.

Also, in the example implementation, the wing body of first stiffener wing 26 and second stiffener wing 28 may have a size and contour configured to optimize a combination of providing a relatively high amount of structural support across enclosure cover 32 (and, hence, display 22) while also providing a relatively low amount of weight and providing a design that is relatively efficient to manufacture. In the example implementation, for instance, first stiffener wing 26 and second stiffener wing 28 have a body that is relatively thin compared to using a flat plate that may provide a similar amount of stiffness to enclosure cover 32, which results from the use of the ribbed structure of the one or more stiffener portions 37. Further, the combination of the one or more stiffener portions 37 and the one or more mounting portions 31 is relatively easy to manufacture, such as forming via stamping a thin, flat plate. Additionally, the use of a light weight but relatively strong material provides weight savings.

For example, first stiffener wing 26 and second stiffener wing 28 may be formed from any material that, in combination with at least enclosure cover 32, provides sufficient support to avoid substantial deflection, e.g., bending or twisting, of display 22. For example, in this case, sufficient support may include at least enough structural support and/or rigidity to resist breaking or cracking one or more components of display 22, such as a glass or plastic display cover layers, display modules including output generating mechanisms (e.g., light emitting diodes (LED), liquid crystal display (LCD) elements, etc.), circuit boards, etc. Also, in order to reduce or minimize weight, the material may be a material having a relatively high strength to weight ratio. Suitable examples of a material that can be used for first stiffener wing 26 and second stiffener wing 28 include, but are not limited to, metals, plastics, composites (e.g., carbon-fiber, metallic, ceramic, etc.). For instance, in one implementation that should not be construed as limiting, first stiffener wing 26 and second stiffener wing 28 may be a metal, such as a stainless steel (e.g., SUS 304).

Also, first stiffener wing 26 and second stiffener wing 28 may have any contour or shape that provides support across a portion (and, preferably, a substantial portion) of enclosure cover 32, such as in areas distal from a main support area (e.g., support mounting area 54 or any other area having additional support). For instance, first and second stiffener wings 26 and 28 may be sized to maximize strength and minimize weight while being shaped to avoid internal components (e.g., components extending from display 22). Also, in some implementations, first and second stiffener wings 26 and 28 may be placed on the diagonals to maximize stiffness at the corners of enclosure cover 32. In this example, for instance, first stiffener wing 26 and second stiffener wing 28 have a substantially triangular shape or a quadrilateral shape that extend in different directions (e.g., and toward one or more corners) to provide support across enclosure cover 32 and/or to improve stiffness at the corners. It should be understood, however, that the example of the wing body of first stiffener wing 26 and second stiffener wing 28 disclosed herein is a single, non-limiting example, and that the wing body may have any number of other sizes, shapes, and configurations sufficient to distribute structural support across enclosure cover 32. For example, rather than having a triangular contour, first stiffener wing 26 and second stiffener wing 28 may have a c-shape, a sideways v-shape, any type of polygon shape, or any shape including straight sides and/or curved sides. Additionally, in some implementations, it should be understood that first stiffener wing 26 and second stiffener wing 28 may be a single, integral component.

Further, as discussed herein, the position and shape of first stiffener wing 26 and second stiffener wing 28 may vary depending on the type and location of any additional support-providing component, such as support mounting area 54 (see, e.g., FIGS. 1 and 2). Thus, in some implementations, the support functionality of first stiffener wing 26 and second stiffener wing 28 may leverage off of or be enhanced by additional support-providing components, such as one or more defined support areas associated with enclosure cover 32 and/or a monitor base assembly 56.

In addition to the cover wall that defines its body, enclosure cover 32 may include one or more side walls such that enclosure cover 32 can form a housing for components of monitor device 24, and/or to provide additional structural support and rigidity to enclosure cover 32. For example, referring to FIGS. 1-3, enclosure cover 32 may include a left side wall 34, a top left side wall 36, a right side wall 38, and a bottom side wall 40, each extending from interior surface 30. For instance, the side walls may extend in a plane substantially perpendicular to a plane in which enclosure cover 32 substantially lies.

As mentioned above, enclosure cover 32 may additionally include support mounting area 54 (see, e.g., FIGS. 1 and 2) that defines a base from which supporting structures fixed to enclosure cover 32 may be mounted. For instance, support mounting area 54 may be located in an area of enclosure cover 32 that can vary depending on an expected position where monitor device 24 will be supported or held during use, and/or depending on what types of movement will be allowed and what other support structures may be utilized with monitor device 24. For example, when monitor device 24 is held (e.g., manually or using a mechanical support structure) near a bottom side, then support mounting area 54 may be located near a bottom portion of enclosure cover 32.

For example, in some cases, the location of support mounting area 54 may be based on monitor device 24 being used in combination with a monitor base assembly 56 (FIGS. 7-9) to which monitor device 24 may be mounted. For instance, in a case where monitor device 24 is designed to rotate in use about a horizontal axis and be adjustably positioned in a vertical direction, in order to maximize vertical adjustability while display 22 is in a substantially vertical position, monitor device 24 may be held near a bottom side. In other examples, support mounting area 54 may be located in a central area of enclosure cover 32. Additionally, in some cases, support mounting area 54 may be split into two or more areas depending upon a structure of any additional support-providing components, such as monitor base assembly 54.

Referring to FIGS. 7-9, in an implementation, to achieve horizontal rotatability and vertical adjustment, monitor base assembly 56 may be configured for relative rotation with respect to monitor device 24 about one or more axes, such as axis 58 and/or axis 60. For example, monitor base assembly 56 may include a base member 62 rotatably connected to an arm assembly 64, which is rotatably connected to a hinge assembly 66. Hinge assembly 66 may rotate about axis 58, and arm assembly 64 may rotate about axis 60, providing horizontal rotation and vertical adjustment based on two degrees of rotational freedom between monitor device 24 and monitor base assembly 56. It should be understood, however, that other configurations may be utilized to achieve similar results.

Referring to FIGS. 7-13, base member 62 may include a base body 68 that provides a footing for monitor base assembly 56 on a surface, such as a table or a body (e.g., thigh) of a user, and may further include a housing 70 enclosing base body 68 and/or one or more components 67 (see FIG. 9) that may be mounted on base body 68. For example, the one or more components 67 may include, but are not limited to, communication interfaces, power interfaces, processors, memory, circuit boards, chips, antenna, or any other device associated with the functionality of display 22 and/or a computer device. Base member 62 may include a variable rotation mechanism 63 connected to arm assembly 64 that allows arm assembly 64 to be rotated between and held in a plurality of angular positions relative to base member 62. For example, in one implementation, variable rotation mechanism 63 may include a piston attached to base member 62 attached to a cam member attached to arm assembly 64. It should be understood, however, that variable rotation mechanism 63 may include any number of other mechanism that can achieve similar functionality.

Arm assembly 64 may include one or more arm members 72 extending from monitor base assembly 56 to provide spaced apart positioning of display 22 (and/or monitor device 24) and monitor base assembly 56. For example, arm member(s) 72 may be sized and/or may have a fixed or adjustable (e.g., telescoping) length that allows display 22 (and/or monitor device 24) to be spaced apart from monitor base assembly 56 to provide height comfortable for a user to view display 22 and/or to allow for relative rotation or movement between monitor device 24 and monitor base assembly 56.

Hinge assembly 66 may include a hinge member 74 that can be fixed to monitor device 24 and/or display 22 via one or more securing members 76. For example, the one or more securing members 76 may include, but are not limited to, screws, nuts and bolts, rivets, or any other structural member that can fixedly hold together hinge member 74 and enclosure cover 32, or hinge member 74 and monitor device 24. Further, the one or more securing members 76 may be fixedly attached, or removably attached to display 22 and/or monitor device 24. Further, hinge assembly 66 may include a selective rotation member 75 that allows hinge member 74 to be rotated between and held in a plurality of angular positions relative to arm assembly 64. For example, in one implementation, selective rotation member 75 may include a spring member connected at one end to hinge member 74 and at another end to a limiting member of a washer attached to an axis member connected to arm assembly 64. The washer may include holes that can be aligned with spring-loaded ball bearings or detents fixed to arm assembly 64, where such alignment defines each of the plurality of angular positions. It should be understood, however, that selective rotation member 75 may include any number of other mechanism that can achieve similar functionality. Optionally, hinge assembly 66 may also include one or more additional components 78 (e.g., communication interfaces, power interfaces, processors, memory, circuit boards, chips, antenna, electromagnetic shields, screws or other attachment mechanisms, etc.) associated with monitor device 24 that may be mounted on hinge member 74. Hinge assembly 66 may further include a hinge cover 80, which may be a protective and/or cosmetic housing that covers hinge member 74, the one or more securing members 76, and the one or more additional components 78.

Referring back to FIGS. 1-9, support mounting area 54 may be aligned with respective support areas 82 (see, e.g., FIGS. 1 and 2) on first stiffener wing 26 and second stiffener wing 28. For instance, when monitor device 24 is supported by another external mechanism, such as monitor base assembly 56, first stiffener wing 26 and second stiffener wing 28 can leverage the support structure provided by the external support mechanism. The relative position of respective support areas 82 on first stiffener wing 26 and second stiffener wing 28 may vary depending on the relative location of support mounting area 54 on enclosure cover 32. For instance, the relative location of support areas 82 may correlate to a relative position of support mounting area 54. For instance, in a case where support mounting area 54 is in a lower portion of enclosure cover 32, then support areas 82 may also be located on a relatively lower portion of first stiffener wing 26 and second stiffener wing 28.

Referring to FIGS. 1, 7, and 13-15, first stiffener wing 26 and second stiffener wing 28 can be fixedly connected at respective support areas 82 to hinge member 74 (see, e.g., FIGS. 7 and 13) of monitor base assembly 56 to define a combined support structure for monitor device 24. For instance, in one example implementation, support mounting area 54 may include one or more internal walls 84 (FIG. 1), which may be flat or threaded, defining respective threaded holes or through holes in enclosure cover 32 and/or monitor device 24. The one or more internal walls 84 are sized to receive a corresponding one or more securing members 76 (FIGS. 7 and 13) that fix hinge member 74 to enclosure cover 32. Additionally, support areas 82 on both first stiffener wing 26 and second stiffener wing 28 may respectively include one or more internal walls 86 (FIGS. 1, 14 and 15), each aligned with a respective portion of the one or more internal walls 84 of enclosure cover 32. The respective one or more internal walls 86 of first stiffener wing 26 and second stiffener wing 28, which may be flat or threaded, may define respective threaded holes or respective through holes sized to receive a corresponding one of the one or more securing members 76.

Figure 13:
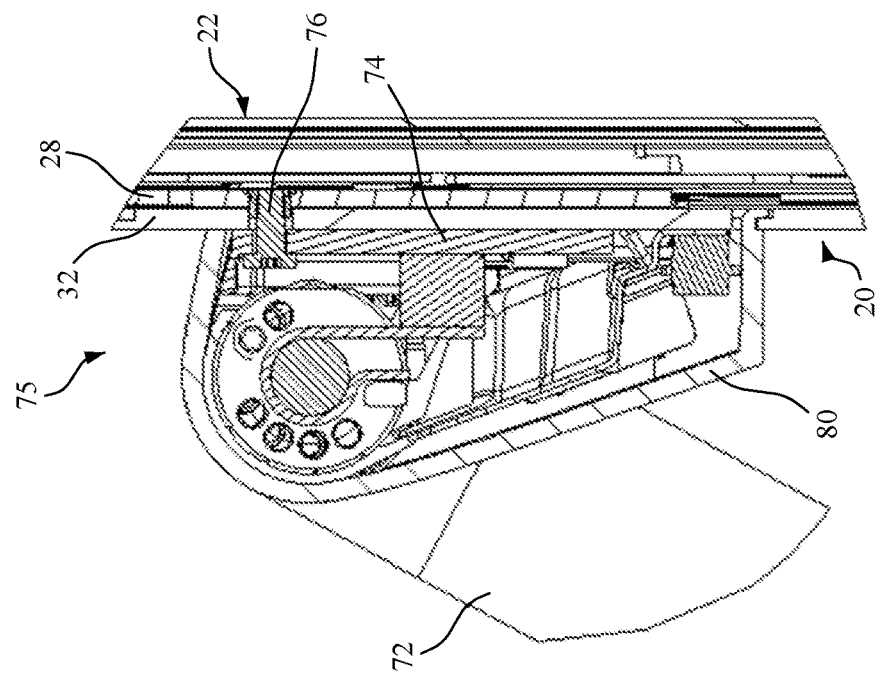
FIG. 13 is a partial cross-sectional view of an example selective rotation member that is hidden from view in FIG. 12.
Figure 12:
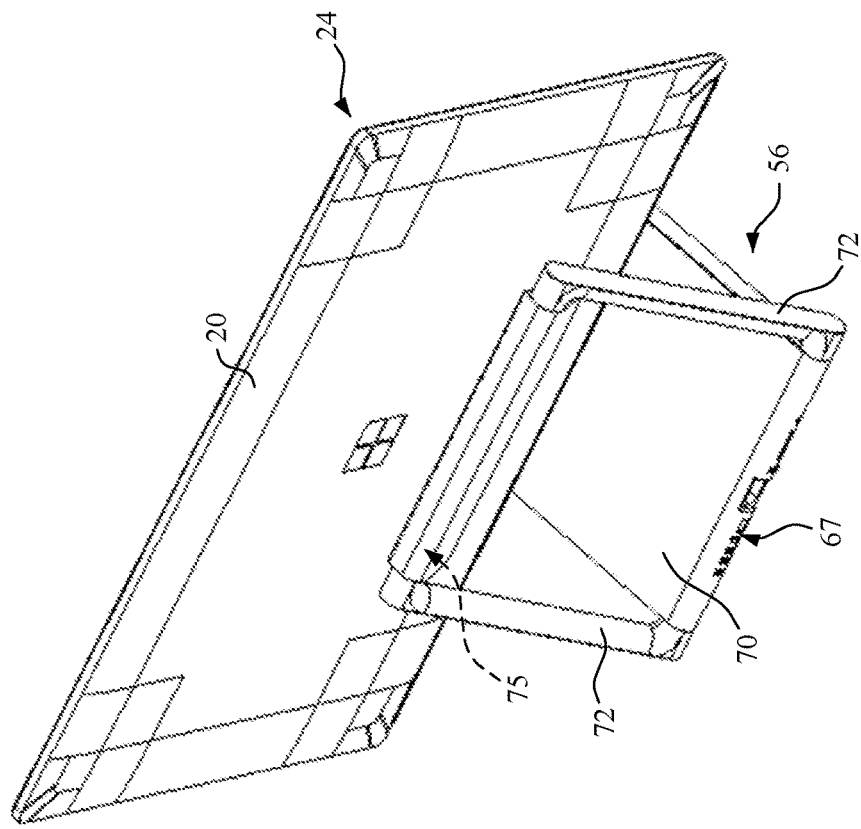
FIG. 12 is a back perspective view of the assembled version of the example monitor device and the example monitor base assembly of FIG. 7.
Figure 14:
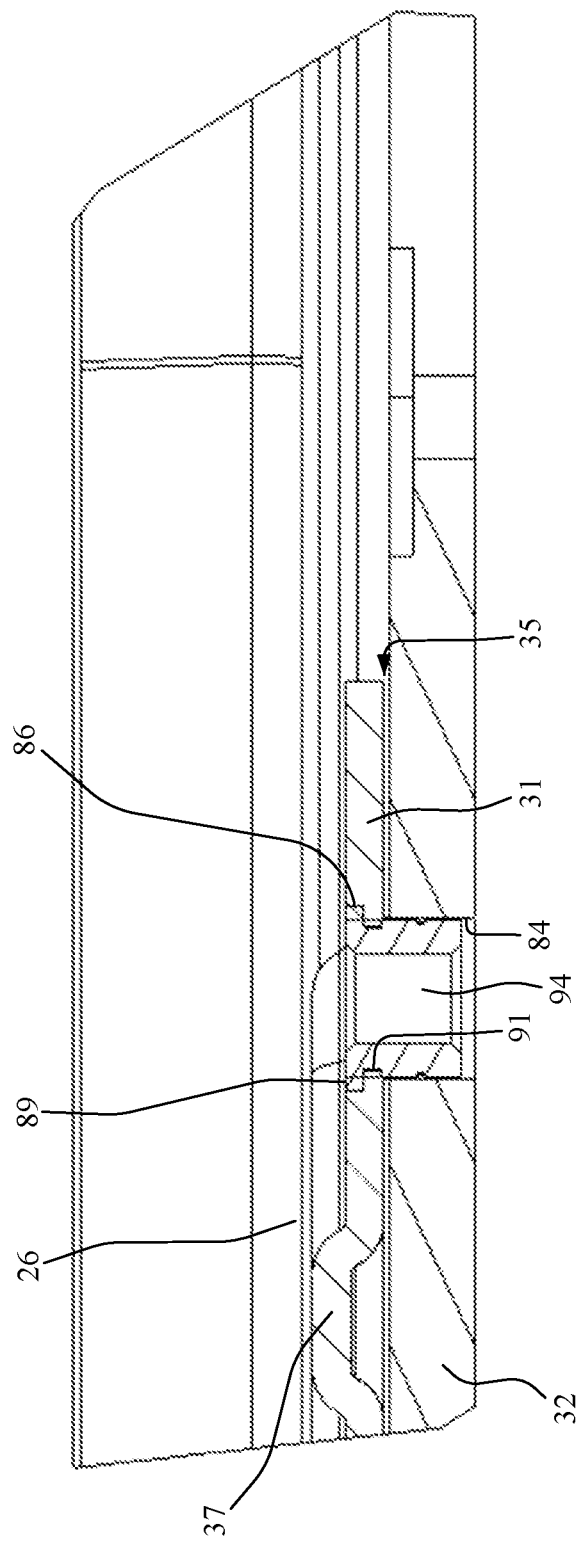
FIG. 14 is a partial cross-sectional view of an example enclosure assembly, similar to FIG. 4, including the enclosure cover, a stiffener wing with a mounting portion and a stiffener portion, and a standoff member positioned within through holes aligned between the enclosure cover and the support wing.
Figure 15:
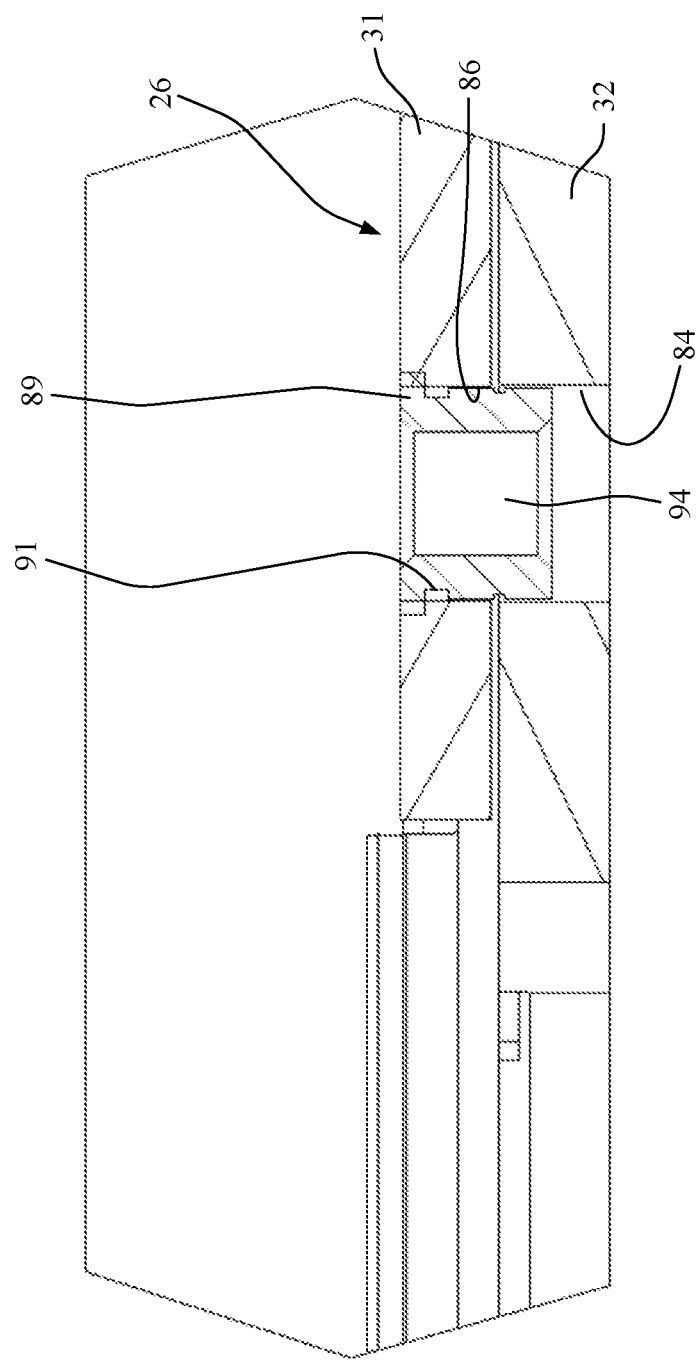
FIG. 15 is a partial cross-sectional view of an example enclosure assembly, similar to FIG. 14.
Figure 16:
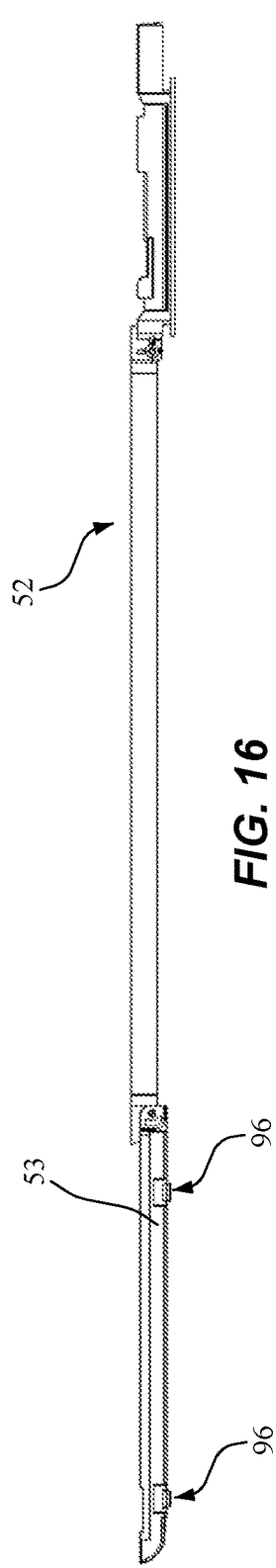
FIG. 16 is a front view of an example deck insert member of FIG. 1.
Figure 17:
FIG. 17 is a bottom view of the example deck insert member of FIG. 16.
Figure 18:
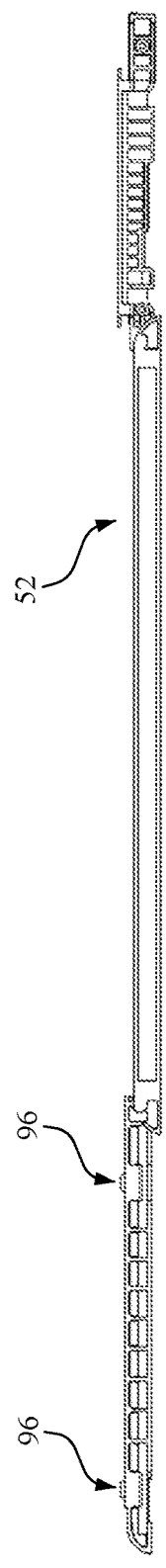
FIG. 18 is a top view of the example deck insert member of FIG. 16.
Figure 21:
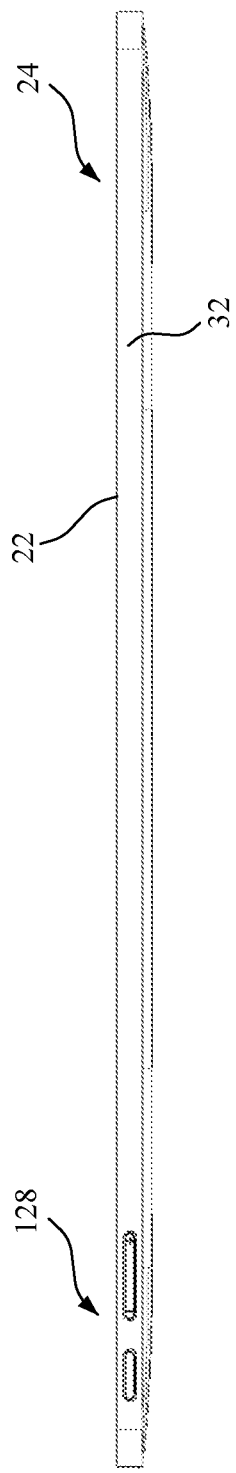
FIG. 21 is a right side view of an assembled version of the monitor device of FIG. 6.
Figure 22:
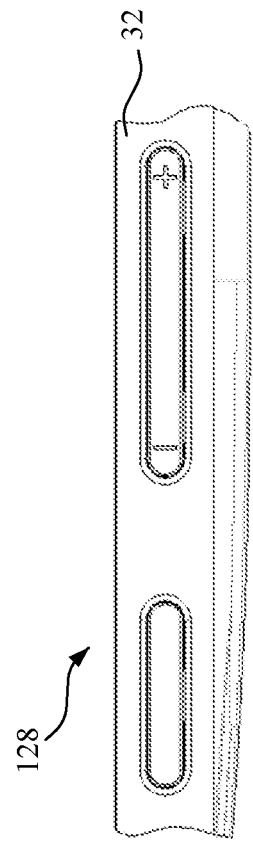
FIG. 22 is a close-up view of a portion of FIG. 21 including buttons.

Referring specifically to FIGS. 13 and 14, in some implementations, respectively aligned ones of the one or more internal walls 84 of support mounting area 54 and corresponding ones of the one or more internal walls 86 of first stiffener wing 26 and second stiffener wing 28, may be flat walls into which a standoff member 94 may be inserted to provide supplemental surface area for attachment. For example, each standoff member 94 may have an annular body with a threaded internal wall for engagement with a respective securing member 76. Further, each standoff member 87 may have a length greater than a thickness of the corresponding internal wall 84 of enclosure cover 32 and/or a thickness of mounting portion 31 of first stiffener wing 26 and second stiffener wing 28, e.g., in order to provide additional area of engagement for the respective securing member 76. In some examples, each standoff member 87 may have one or more flanges 89 extending out from the annular body and/or one or more recessed walls 91 on the outer surface of the annular body for engagement with the corresponding internal wall 84 of enclosure cover 32 and/or the corresponding internal wall 86 of the respective first stiffener wing 26 or second stiffener wing 28. For example, the one or more flanges 89 extending out from the annular body and/or the one or more recessed walls 91 on the outer surface of the annular body may be utilized when each standoff member 87 is assembled into enclosure assembly 20 via a force fit. It should be understood that other assembly methods may be utilized, however, which may dictate other structures for each standoff member 87. For instance, the outer surface of each standoff member 87 may be threaded, which may engage with threading on the internal wall 84 of enclosure cover 32 and/or the internal wall of the respective first stiffener wing 26 or second stiffener wing 28.

Thus, upon assembly, monitor device 24 includes first stiffener wing 26 and second stiffener wing 28, enclosure cover 32, and hinge member 74 sandwiched together by one or more securing members 76 to form a substantially rigid connection and support structure.

Enclosure cover 32 may be formed from any material that, in combination with at least first stiffener wing 26 and second stiffener wing 28, provides sufficient support to avoid substantial deflection, e.g., bending or twisting, of display 22. For example, in this case, sufficient support may include at least enough structural support and/or rigidity to resist breaking or cracking one or more components of display 22, such as a glass or plastic display cover layers, display modules including output generating mechanisms (e.g., light emitting diodes (LED), liquid crystal display (LCD) elements, etc.), circuit boards, etc. Suitable examples of a material that can be used for enclosure cover 32 include, but are not limited to, metals, plastics, composites (e.g., carbon-fiber, metallic, ceramic, etc.). For instance, in one implementation that should not be construed as limiting, enclosure cover 32 may be a metal, such as an aluminum (e.g., Al 5052-O), which may be stamped from a single flat piece of sheet metal and forged to shape with four vertical sidewalls.

Referring back to FIGS. 1 and 2, in some implementations, enclosure assembly 20 may include a cover plate 88 that provides enclosure cover 32 with enhanced support in the area where hinge assembly 66 is attached. For example, cover plate 88 may include a body, which may be a flat plate, sized to cover an area encompassing at least a portion the one or more internal walls 84 for receiving one or more of the one or more securing members 76 in support mounting area 54. Further, cover plate 88 may respectively include one or more internal walls 90, each aligned with a respective portion of the one or more internal walls 84 of enclosure cover 32. The respective one or more internal walls 90 of cover plate 88, which may be flat or threaded, define respective threaded holes or respective through holes sized to receive a corresponding one of the one or more securing members 76. Additionally, in some implementations, cover plate 88 may include respective standoff members 87 within each internal wall 90 in a same manner as discussed above with respect to first stiffener wing 26, second stiffener wing 28, and enclosure cover 32. Cover plate 88 can be sized and shaped so as to distribute any force transferred via a respective securing member 76 across a larger area of enclosure cover 32. Thus, in this implementation, upon assembly, monitor device 24 includes first stiffener wing 26 and second stiffener wing 28, enclosure cover 32, and hinge member 74 sandwiched together by one or more securing members 76, and also cover plate 88, enclosure cover 32, and hinge member 74 sandwiched together, to form a substantially rigid connection and support structure. Cover plate 86 may be formed from any type of material capable of distributing any such force, and/or capable of withstanding compressive forces based on the attachment of hinge member 74 to cover plate 88. Additionally, in some cases, cover plate 86 may be integrated into one or both of first stiffener wing 26 and second stiffener wing 28 to form an integral stiffening structure.

Enclosure assembly 20 may also include one or more clips 92 (FIG. 2) that provide additional attachment points for fixing first stiffener wing 26 and second stiffener wing 28 to enclosure cover 32. For example, each clip 92 may have two flange portions in different plans connected at adjacent ends by a connector portion, e.g., forming a z-shape or s-shape when viewed from the side. Further, each clip 92 may be attached to enclosure cover 32 and each of first stiffener wing 26 and second stiffener wing 28 by fixing device 35 (e.g., adhesive, etc.).

Referring to FIGS. 1, 2, and 16-20, enclosure assembly 20 additionally may include a plurality of deck insert members 41 for providing a mounting surface for display 22 and/or for providing additional structural support to enclosure assembly 20 and/or monitor device 24. In an example implementation, for instance, enclosure assembly 20 may include a left side deck insert member 42, a top left deck insert member 44, a top right deck insert member 46, a right side deck insert member 48, a bottom right deck insert member 50, and a bottom left deck insert member 52. In general, each of the plurality of deck insert members 41 may be sized to fit within enclosure assembly 20 adjacent to portions of the one or more side walls (e.g., left side wall 34, top left side wall 36, right side wall 38, and bottom side wall 40) and adjacent to interior surface 30. The plurality of deck insert members 41 each may include a body having one or more mounting surfaces 53 facing way from interior surface 30 of enclosure cover 32. The plurality of deck insert members 41 may be formed of any material suitable to provide one or more fixed mounting surfaces 53 for display 22, and preferably a material having a relatively light weight, or a relatively lighter weight than a material from which enclosure cover 32 is formed. As such, the plurality of deck insert members 41 may provide enclosure cover 32 with supplemental surface area, defined by one or more mounting surfaces 53, for affixing display 22 to enclosure assembly 20 while also helping to limit a weight of enclosure assembly 20. For example, but not limited hereto, the plurality of deck insert members 41 may be formed of a plastic, a metal, or a composite material. For instance, in one implementation but not limited hereto, the plurality of deck insert members are formed of polycarbonate (PC) and/or a PC—acrylonitrile butadiene styrene (ABS) material. Further, the plurality of deck insert members 41 may be fixed within enclosure cover 32 and subsequently machined, e.g., to accurately position a plane of each mounting surface 53, to achieve dimensional accuracy for mounting display 22.

Each of the plurality of deck insert members may be attached to enclosure cover 32 in one or more manners. For example, in some cases, each of the plurality of deck insert members 41 may be attached to enclosure cover 32 using fixing device 35 (e.g., an adhesive, etc.).

Referring specifically to FIGS. 19 and 20, in an alternative or additional example, each of the plurality of deck insert members 41 (bottom left deck insert member 52 in this example) may include an attachment member 96 that engages a corresponding attachment member 98 on enclosure cover 32. For example, attachment member 96 may be a tang member 100 extending from a body 102 of each deck insert member (bottom left deck insert member 52 in this example), and attachment member 98 may be a recessed side wall 103 defining a side channel 104 in an internal surface 106 of a side wall (bottom side wall 40 in this example) of enclosure cover 32. Tang member 100 has a size and shape configured to fit within at least a portion of side channel 104. In an implementation, tang member 100 has an elastic characteristic, which may be a function of the material of the respective deck insert member and a shape of tang member 100, that allows tang member 100 to deflect toward body 102 of the respective deck insert member upon insertion within enclosure cover 32 and interference with the side wall (e.g., side wall 40). Further, the elastic characteristic allows tang member 100 to return toward an original position and move into side channel 104 (e.g., snap into place) upon full insertion and/or upon alignment with side channel 104.

In an implementation, in order to resist the deflection force of tang member 100 against an internal surface 106 of a side wall (bottom side wall 40 in this example) of enclosure cover 32 upon insertion into enclosure cover 32, or in order to maintain or fix a relative position of tang member 100 within side channel 104, each of the plurality of deck insert members 41 (e.g., bottom left deck insert member 52 in this example) may include a corresponding one or more foot members 108 that extend from a bottom surface 110 of the respective deck insert member and fits into a recessed wall 111 defining a bottom channel 112 within interior surface 30 of enclosure cover 32. Movement of foot member 108 is limited by a side wall 114 of bottom channel 112, thereby causing tang member 100 to deflect upon insertion within enclosure cover 32 until being aligned with side channel 104. Tang member 100 may further include an end wall 116 (e.g., a flat wall, a rounded wall) that is restrained within side channel 104 by a channel wall 118, thereby holding the respective deck insert member into place within enclosure cover 32. It should be understood that tang member 100 and side channel 104 are one example of attachment member 96 and corresponding attachment member 98, and that other mechanisms may be utilized to attach each deck insert member to enclosure cover 32.

Referring back to FIG. 5, enclosure assembly 20 may further include one or more fixing members 120 to fix display 22 to enclosure cover 32. For example, the one or more fixing members 120 may attach to enclosure cover 32 via mounting surfaces 53 of deck insert members (e.g., left side deck insert member 42, top left deck insert member 44, top right deck insert member 46, right side deck insert member 48, bottom right deck insert member 50, and bottom left deck insert member 52). For example, fixing member 120 may include, but is not limited to an adhesive, a rivet, a screw, a nut and bolt, a weld, or any other mechanism that may be used to connect and fixedly position display 22 on enclosure assembly 20. In one implementation, for example, fixing member 120 may be a pressure sensitive adhesive strip.

Referring to FIGS. 5 and 21-24, enclosure assembly 20 may include one or more additional components that may vary depending on a configuration and desired functionality of monitor device 24. For example, enclosure assembly 20 may include one or more speakers 122, which may be mounted to enclosure cover 32 and aligned with openings in enclosure cover 32 to allow the generated sound to exit. Further, enclosure assembly 20 may include a corresponding one or more speaker covers 124 aligned with the one or more speakers 122, where speaker cover 124 may be a material that allows sound to pass, such as a mesh, or a film, or a plastic having holes, etc. Also, enclosure assembly 20 may include a button carrier assembly 126 for holding one or more monitor control buttons 128, such as an on/off button, a speaker volume button, a monitor menu button, etc. Further, enclosure assembly 20 may include one or more stylus attachment mechanisms 130, such as magnetic field generating mechanisms (e.g., magnets) or members attracted to a magnetic field (e.g., ferrous materials), for holding a stylus or pen associated with a touch sensitive display to enclosure assembly 20. Also, enclosure assembly 20 may include a bumper 132 mounted on a bottom side of enclosure assembly 20 for cushioning impact of monitor device 24 with other structures. Further, enclosure assembly 20 may include one or more heat spreading mechanisms 134, such as spaces to provide a gap to allow airflow between display 22 and enclosure assembly 20 and/or such as thermally-conductive members to help dissipate heat from display 22.

In some implementations, enclosure assembly 20 may also include an information identifier 136 (FIG. 1) to identify a name or other information associated with enclosure assembly 20, monitor device 24, and/or display 22.

Additionally, an example of a method of making enclosure assembly 20 and/or monitor device 24, optionally including monitor base assembly 56, may include a number of actions that may performed in series, in parallel, or in a different order than presented herein. The method may include attaching one or more stiffener wings to an enclosure cover. Further, the method may include attaching one or more deck insert members to the enclosure cover. Also, the method may include machining each of the one or more deck insert members to define a respective mounting surface on each deck insert member. Further, the method may include attaching a display to the enclosure cover at each mounting surface. Additionally, the method may include attaching a monitor base assembly to the enclosure cover.

In summary, one example implementation relates to an enclosure assembly of a monitor device. The enclosure assembly includes an enclosure cover having a cover wall extending substantially in a first plane between a plurality of sides, wherein the cover wall includes an interior surface and an opposing exterior surface. Further, the enclosure assembly includes a first stiffener wing and a second stiffener wing each having one or more mounting portions spaced apart from one or more stiffener portions to define one or more wing body ribs, wherein each mounting portion includes a mounting surface opposing a corresponding portion of the interior surface of the cover wall. Additionally, the first stiffener wing includes a first wing body that extends toward a first side of the enclosure cover, and the second stiffener wing includes a second wing body that extends to a second side of the enclosure cover different from the first side.

In an implementation of the enclosure assembly, the interior surface of the cover wall includes a support mounting area, the first wing body extends from the hinge mounting area, and the second wing body extends from the hinge mounting area.

In another implementation of the enclosure assembly, for each of the first stiffener wing and the second stiffener wing, the one or more mounting portions are located substantially in a second plane adjacent to the first plane, and the one or more stiffener portions are located substantially in a third plane spaced apart from the first plane.

Another implementation of the enclosure assembly further includes an adhesive connecting each mounting surface of each mounting portion of both the first stiffener wing and the second stiffener wing to the corresponding portion of the interior surface of the cover wall.

In an implementation of the enclosure assembly, the first stiffener wing and the second stiffener wing have a substantially triangular shape or a quadrilateral shape. Also, the respective one or more stiffener portions on each of the first stiffener wing and the second stiffener wing extend in a plurality of directions. Further, at least two of the one or more stiffener portions on each of the first stiffener wing and the second stiffener wing are connected at a junction.

In an implementation of the enclosure assembly, the enclosure cover includes a first set of internal walls in a support mounting area, the first stiffener wing includes a second set of internal walls aligned with a first subset of the first set of internal walls, the second stiffener wing includes a third set of internal walls aligned with a second subset of the first set of internal walls, and each internal wall of the first set, the second set, and the third set defines a through hole or a threaded hole sized to receive a respective securing device configured to fix the enclosure cover, the first stiffener wing, and the second stiffener wing.

Another implementation of the enclosure assembly further includes a plurality of deck insert members along one or more portions of a perimeter of the interior surface, one or more of the plurality of deck members including a mounting surface. In some cases, one or more of the plurality of deck insert members further comprises a first attachment member having a shape to engage a corresponding second attachment member defined in the enclosure cover and fix a relative position of the respective deck insert member with respect to the enclosure cover. Also, in some cases, the enclosure cover comprises at least one side wall having the second attachment member defined by a side channel within the at least one side wall, and the first attachment member includes a tang member extending from a body of the respective deck insert member and having a size and a shape that fits within the side channel. Further, in some cases, may additionally include a recessed wall defining a bottom channel within the interior surface of the enclosure cover, and one or more of the plurality of deck insert members further include a foot member that extends from a bottom surface of the respective deck insert member and fits into the bottom channel within the interior surface of the enclosure cover. Also, in some cases, the enclosure cover further includes at least one side wall having a side channel within the at least one side wall, and a recessed wall defining a bottom channel within the interior surface of the enclosure cover, and one or more of the plurality of deck insert members further include a tang member extending from a body of the respective deck insert member and having a size and a shape that fits within the side channel, and a foot member that extends from a bottom surface of the respective deck insert member and fits into the bottom channel within the interior surface of the enclosure cover.

An implementation of the enclosure assembly may further include one or more standoff members, wherein the cover wall of the enclosure cover includes a first set of one or more internal walls defining a first set of through holes, wherein the one or more mounting portions of each of the first stiffener wing and the second stiffener wing each have a second set of one or more internal walls defining a second set of through holes each corresponding to at least a portion of the first set of through holes in the cover wall, and wherein the one or more standoffs having a body sized and shaped to fit within respectively aligned ones of the first set of through holes and the second set of through holes.

In an implementation of the enclosure assembly, the assembly further includes two or more clips respectively positioned to connect at least a portion of each of the first stiffener wing and the second stiffener wing to the interior surface of the cover wall.

In another implementation, the enclosure assembly further includes a cover plate, wherein the cover wall of the enclosure cover includes a support mounting area, and wherein at least a part of the cover plate and at least a part of each mounting portion of each of the first stiffener wing and the second stiffener wing are aligned within the support mounting area.

Additionally, in some implementations, the enclosure assembly may include a display fixedly connected to the enclosure cover. Also, the enclosure assembly may additionally include a monitor base assembly fixedly connected to the enclosure cover and the display.

Another implementation relates to a monitor device. The monitor device includes an enclosure cover having a cover wall extending substantially in a first plane between a plurality of sides, wherein the cover wall includes an interior surface and an opposing exterior surface. Further, the monitor device includes a first stiffener wing and a second stiffener wing each having one or more mounting portions spaced apart from one or more stiffener portions to define one or more wing body ribs, wherein each mounting portion includes a mounting surface opposing a corresponding portion of the interior surface of the cover wall. The first stiffener wing includes a first wing body that extends toward a first side of the enclosure cover, and the second stiffener wing includes a second wing body that extends to a second side of the enclosure cover different from the first side. Also, the monitor device includes a plurality of deck insert members along one or more portions of a perimeter of the interior surface, one or more of the plurality of deck members including a mounting surface, and a display fixedly mounted to each mounting surface via one or more fixing members. Additionally, the monitor device includes a monitor base assembly fixedly connected to the enclosure cover and the display.

In an implementation of the monitor device, the enclosure cover includes a first set of internal walls in a support mounting area, the first stiffener wing includes a second set of internal walls aligned with a first subset of the first set of internal walls, the second stiffener wing includes a third set of internal walls aligned with a second subset of the first set of internal walls, and each internal wall of the first set, the second set, and the third set defines a through hole or a threaded hole sized to receive a respective securing device configured to fix the enclosure cover, the first stiffener wing, and the second stiffener wing.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of assemblies that may include a number of devices, components, modules, and the like. It is to be understood and appreciated that the various assemblies may include additional devices, components, modules, etc. and/or may not include all of the devices, components, modules, etc., discussed in connection with the figures. A combination of these approaches may also be used.

While example implementations of the present disclosure have been described in this document, it will be understood by those skilled in the art that variations and modifications of the implementations described above may be made without departing from the scope of this disclosure. Other implementations will be apparent to those skilled in the art from a consideration of this description or from a practice in accordance with examples disclosed in this document. Thus, the following claims are intended to include other variations and implementations of the present disclosure.

What is claimed is:

1. An enclosure assembly of a monitor device, comprising:
    an enclosure cover having a cover wall extending substantially in a first plane between a plurality of sides, wherein the cover wall includes an interior surface and an opposing exterior surface;
    a first stiffener wing and a second stiffener wing each having a plurality of mounting portions spaced apart from a plurality of stiffener portions to define a plurality of wing body ribs, wherein each mounting portion includes a mounting surface opposing a corresponding portion of the interior surface of the cover wall;
    wherein the first stiffener wing and the second stiffener wing are separate from and affixable to the interior surface of the cover wall;
    wherein for each of the first stiffener wing and the second stiffener wing, the plurality of mounting portions are located substantially in a second plane adjacent to the first plane, and the plurality of stiffener portions are located substantially in a third plane spaced apart from the first plane;
    wherein the first stiffener wing includes a first wing body that extends toward a first side of the enclosure cover; and
    wherein the second stiffener wing includes a second wing body that extends to a second side of the enclosure cover different from the first side.

2. The enclosure assembly of claim 1,
    wherein the interior surface of the cover wall includes a support mounting area;
    wherein the first wing body extends from the support mounting area; and
    wherein the second wing body extends from the support mounting area.

3. The enclosure assembly of claim 1, further comprising an adhesive connecting each mounting surface of each mounting portion of both the first stiffener wing and the second stiffener wing to the corresponding portion of the interior surface of the cover wall.

4. The enclosure assembly of claim 1, wherein the first stiffener wing and the second stiffener wing have a substantially triangular shape or a quadrilateral shape.

5. The enclosure assembly of claim 1, wherein the respective stiffener portions on each of the first stiffener wing and the second stiffener wing extend in a plurality of directions.

6. The enclosure assembly of claim 1, wherein at least two of the stiffener portions on each of the first stiffener wing and the second stiffener wing are connected at a junction.

7. The enclosure assembly of claim 1,
    wherein the enclosure cover includes a first set of internal walls in a support mounting area;
    wherein the first stiffener wing includes a second set of internal walls aligned with a first subset of the first set of internal walls;
    wherein the second stiffener wing includes a third set of internal walls aligned with a second subset of the first set of internal walls; and
    wherein each internal wall of the first set, the second set, and the third set defines a through hole or a threaded hole sized to receive a respective securing device configured to fix the enclosure cover, the first stiffener wing, and the second stiffener wing.

8. The enclosure assembly of claim 1, further comprising a plurality of deck insert members along one or more portions of a perimeter of the interior surface, one or more of the plurality of deck members including a mounting surface.

9. The enclosure assembly of claim 8, wherein one or more of the plurality of deck insert members further comprises a first attachment member having a shape to engage a corresponding second attachment member defined in the enclosure cover and fix a relative position of the respective deck insert member with respect to the enclosure cover.

10. The enclosure assembly of claim 9,
    wherein the enclosure cover comprises at least one side wall having the second attachment member defined by a side channel within the at least one side wall; and
    wherein the first attachment member includes a tang member extending from a body of the respective deck insert member and having a size and a shape that fits within the side channel.

11. The enclosure assembly of claim 8,
    wherein the enclosure cover further comprises a recessed wall defining a bottom channel within the interior surface of the enclosure cover; and
    wherein one or more of the plurality of deck insert members further comprises a foot member that extends from a bottom surface of the respective deck insert member and fits into the bottom channel within the interior surface of the enclosure cover.

12. The enclosure assembly of claim 8,
    wherein the enclosure cover further comprises:
        at least one side wall having a side channel within the at least one side wall, and
        a recessed wall defining a bottom channel within the interior surface of the enclosure cover;
    wherein one or more of the plurality of deck insert members further comprise:

a tang member extending from a body of the respective deck insert member and having a size and a shape that fits within the side channel, and a foot member that extends from a bottom surface of the respective deck insert member and fits into the bottom channel within the interior surface of the enclosure cover.

13. The enclosure assembly of claim 1, further comprising:

one or more standoff members;

wherein the cover wall of the enclosure cover includes a first set of one or more internal walls defining a first set of through holes;

wherein the plurality of mounting portions of each of the first stiffener wing and the second stiffener wing each have a second set of one or more internal walls defining a second set of through holes each corresponding to at least a portion of the first set of through holes in the cover wall; and wherein the one or more standoffs having a body sized and shaped to fit within respectively aligned ones of the first set of through holes and the second set of through holes.

14. The enclosure assembly of claim 1, further comprising two or more clips respectively positioned to connect at least a portion of each of the first stiffener wing and the second stiffener wing to the interior surface of the cover wall.

15. The enclosure assembly of claim 1, further comprising:

a cover plate;

wherein the cover wall of the enclosure cover includes a support mounting area; and wherein at least a part of the cover plate and at least a part of each mounting portion of each of the first stiffener wing and the second stiffener wing are aligned within the support mounting area.

16. The enclosure assembly of claim 1, further comprising a display fixedly connected to the enclosure cover.

17. The enclosure assembly of claim 16, further comprising a monitor base assembly fixedly connected to the enclosure cover and the display.

18. A monitor device, comprising:

an enclosure cover having a cover wall extending substantially in a first plane between a plurality of sides, wherein the cover wall includes an interior surface and an opposing exterior surface;

a first stiffener wing and a second stiffener wing each having a plurality of mounting portions spaced apart from a plurality of stiffener portions to define a plurality of wing body ribs, wherein each mounting portion includes a first mounting surface opposing a corresponding portion of the interior surface of the cover wall;

wherein the first stiffener wing and the second stiffener wing are separate from and affixable to the interior surface of the cover wall;

wherein for each of the first stiffener wing and the second stiffener wing, the plurality of mounting portions are located substantially in a second plane adjacent to the first plane, and the plurality of stiffener portions are located substantially in a third plane spaced apart from the first plane;

wherein the first stiffener wing includes a first wing body that extends toward a first side of the enclosure cover;

wherein the second stiffener wing includes a second wing body that extends to a second side of the enclosure cover different from the first side;

a plurality of deck insert members along one or more portions of a perimeter of the interior surface, one or more of the plurality of deck members including a second mounting surface;

a display fixedly mounted to the second mounting surface of the one or more of the plurality of deck members via one or more fixing members; and a monitor base assembly fixedly connected to the enclosure cover and the display.

19. The monitor device of claim 18, wherein the enclosure cover includes a first set of internal walls in a support mounting area;

wherein the first stiffener wing includes a second set of internal walls aligned with a first subset of the first set of internal walls;

wherein the second stiffener wing includes a third set of internal walls aligned with a second subset of the first set of internal walls; and wherein each internal wall of the first set, the second set, and the third set defines a through hole or a threaded hole sized to receive a respective securing device configured to fix the enclosure cover, the first stiffener wing, and the second stiffener wing.

20. The enclosure assembly of claim 1, wherein the plurality of mounting portions and the plurality of stiffener portions are integrally formed in each of the first stiffener wing and the second stiffener wing.

21. The enclosure assembly of claim 1, wherein the first stiffener wing and the second stiffener wing are coplanarly extended across different parts of the interior surface of the cover wall.

* * * * *